US012752618B2

(12) United States Patent
Dalla Palma et al.

(10) Patent No.: US 12,752,618 B2
(45) Date of Patent: Oct. 6, 2026

(54) ELECTRICAL HYBRIDIZATION OF HYDROMECHANICAL VARIABLE TRANSMISSION

(71) Applicant: DANA ITALIA S.R.L., Arco (IT)

(72) Inventors: Lorenzo Dalla Palma, Arco (IT); Pier Paolo Rinaldi, Arco (IT); Matteo Palmieri, San Prospero (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/893,288

(22) Filed: Sep. 23, 2024

(65) Prior Publication Data

US 2026/0084513 A1 Mar. 26, 2026

(51) Int. Cl.

| | |
|---|---|
| ***F16H 47/04*** | (2006.01) |
| ***B60K 6/365*** | (2007.10) |
| ***B60K 6/387*** | (2007.10) |
| ***B60K 6/442*** | (2007.10) |
| ***B60K 6/543*** | (2007.10) |

(52) U.S. Cl.

CPC .............. *B60K 6/543* (2013.01); *B60K 6/365* (2013.01); *B60K 6/387* (2013.01); *B60K 6/442* (2013.01); *F16H 47/04* (2013.01); *B60Y 2200/92* (2013.01)

(58) Field of Classification Search

CPC ........ B60K 6/543; B60K 6/365; B60K 6/387; B60K 6/442; F16H 47/04; F16H 2047/045

See application file for complete search history.

(56) References Cited

U.S. PATENT DOCUMENTS 11,719,334 B1 * 8/2023 Dalla Palma ......... F16H 61/421 475/81
2013/0186233 A1 * 7/2013 Kaltenbach ............. F16H 3/089 903/902

FOREIGN PATENT DOCUMENTS

DE 102012216277 A1 * 3/2014 ............. F16H 47/04

* cited by examiner

*Primary Examiner* — Tisha D Lewis
(74) *Attorney, Agent, or Firm* — McCoy Russell LLP

(57) ABSTRACT

Methods and systems for a hybrid hydromechanical variable transmission (HVT) are provided. In one example, a transmission system includes a hydraulic pump rotationally coupled to an input shaft; a hydraulic motor rotationally coupled to an output shaft via a first drive range clutch; a planetary gear set including a sun gear rotationally coupled to the hydraulic motor, a carrier rotationally coupled to the output shaft, and a ring gear rotationally coupled to one or more clutches connected to the input shaft; a prime power source rotationally coupled to the input shaft; and an electric machine that is selectively rotationally coupled to the input shaft or to the output shaft, or is mechanically isolated from the input shaft and the output shaft, via actuation of a dog clutch.

17 Claims, 7 Drawing Sheets

200

| | First forward drive range | Second forward drive range | Third forward drive range | First reverse drive range | Second reverse drive range | Third reverse drive range |
|---|---|---|---|---|---|---|
| Reverse clutch (108) | disengaged | disengaged | disengaged | engaged | engaged | engaged |
| First drive range clutch (152) | engaged | disengaged | disengaged | engaged | disengaged | disengaged |
| Second drive range clutch (110) | disengaged | engaged | disengaged | disengaged | engaged | disengaged |
| Third drive range clutch (126) | disengaged | disengaged | engaged | disengaged | disengaged | engaged |

FIG. 2A

250

| | Engaged in first position | Engaged in second position | Neutral position |
|---|---|---|---|
| Dog clutch (129) | Electric machine (133) coupled with prime power source (104) | Electric machine (133) coupled with drive wheels (172, 173) | Mechanically isolated from transmission system (100) |

FIG. 2B

ELECTRICAL HYBRIDIZATION OF HYDROMECHANICAL VARIABLE TRANSMISSION

TECHNICAL FIELD

The present disclosure relates to a hybrid hydromechanical variable transmission and control strategy for selective coupling of an electric machine via a dog clutch of the hybrid hydromechanical variable transmission.

BACKGROUND AND SUMMARY

Electrical hybridization of power split transmissions comprises including an electric machine in a transmission layout. Inclusion of the electric machine in the transmission layout enables a reduction in power source consumption in heavy duty machinery due to high-power peak recovery in a braking phase. Energy that is recovered and stored may be used to power movement of the vehicle in a full electric mode, for example when a diesel engine is powered off. Stored energy may additionally or alternatively be used to boost power delivery in heavy duty maneuvers. In further examples, the electric machine may be used to charge a battery, where a prime power source (e.g., the diesel engine) is used to generate power. The electric machine provides additional brake capacity, and a retarder may be used to provide supplemental braking power to stop rotational motion of shafts driven by the electric machine and/or the prime power source. While hybrid power split transmissions may be a relatively high efficiency solution (e.g., approximately 80% efficiency) for bringing power from the prime power source to wheels of the vehicle, there exist multiple points in the power split transmission where efficiency may be further increased. Additionally, inclusion of a second power source (e.g., the electrical machine) may decrease fuel consumption of the vehicle. Conventional hybrid power split transmissions may demand use of an additional engine braking system to sufficiently stop motion of the vehicle when both the prime power source and the electric machine are used to power driving of the vehicle.

Hydromechanical transmissions enable performance characteristics such as efficiency, shift quality, drive characteristics, and control response from mechanical and hydrostatic transmissions to be combined to meet vehicle design objectives. Some hydromechanical transmissions, referred to in the art as hydromechanical variable transmissions (HVTs), provide continuously variable gear ratios. Hydromechanical transmissions may be particularly desirable due to their efficiency. Vehicles used in industries such as agriculture, construction, mining, material handling, oil and gas, and the like have made use of HVTs. In HVTs, relatively high fixed power losses may cause transmission efficiency to drop at lower power flows. For example, transmission efficiency may decrease due to a charging pump, clutch drag losses, and leakages of hydrostatic machines.

To address at least some of the abovementioned issues, the inventors developed a hybrid HVT system. In one example, a hybrid HVT transmission system comprises a hydraulic pump rotationally coupled to an input shaft; a hydraulic motor rotationally coupled to an output shaft via a first drive range clutch; a planetary gear set comprising a sun gear rotationally coupled to the hydraulic motor, a carrier rotationally coupled to the output shaft, and a ring gear rotationally coupled to one or more clutches connected to the input shaft; a prime power source rotationally coupled to the input shaft; and an electric machine that is selectively rotationally coupled to the input shaft or to the output shaft, or is mechanically isolated from the input shaft and the output shaft, via actuation of a dog clutch. In this way, the transmission system's operating efficiency is increased while enabling the controllability of the transmission system, including hydraulic motor torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2A shows a table which indicates the configuration of clutches in the hybrid HVT, shown in FIG. 1, in different drive ranges.

FIG. 2B shows table which indicates engagement of a dog clutch in the hybrid HVT of FIG. 1 in different energy management strategies.

DETAILED DESCRIPTION

Figure 1:
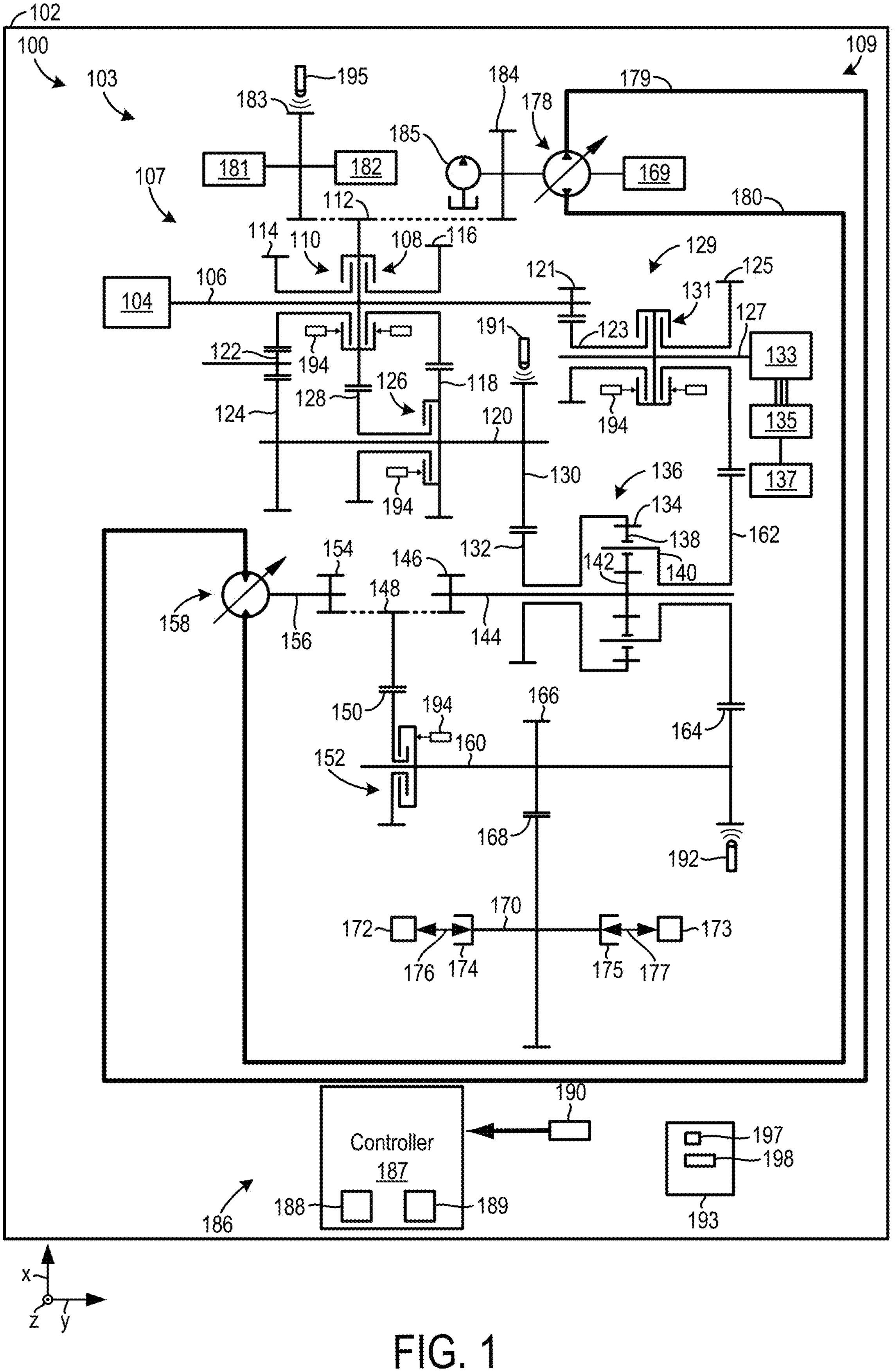
FIG. 1 shows a schematic representation of a vehicle with a hybrid hydromechanical variable transmission (HVT).
Figure 3:
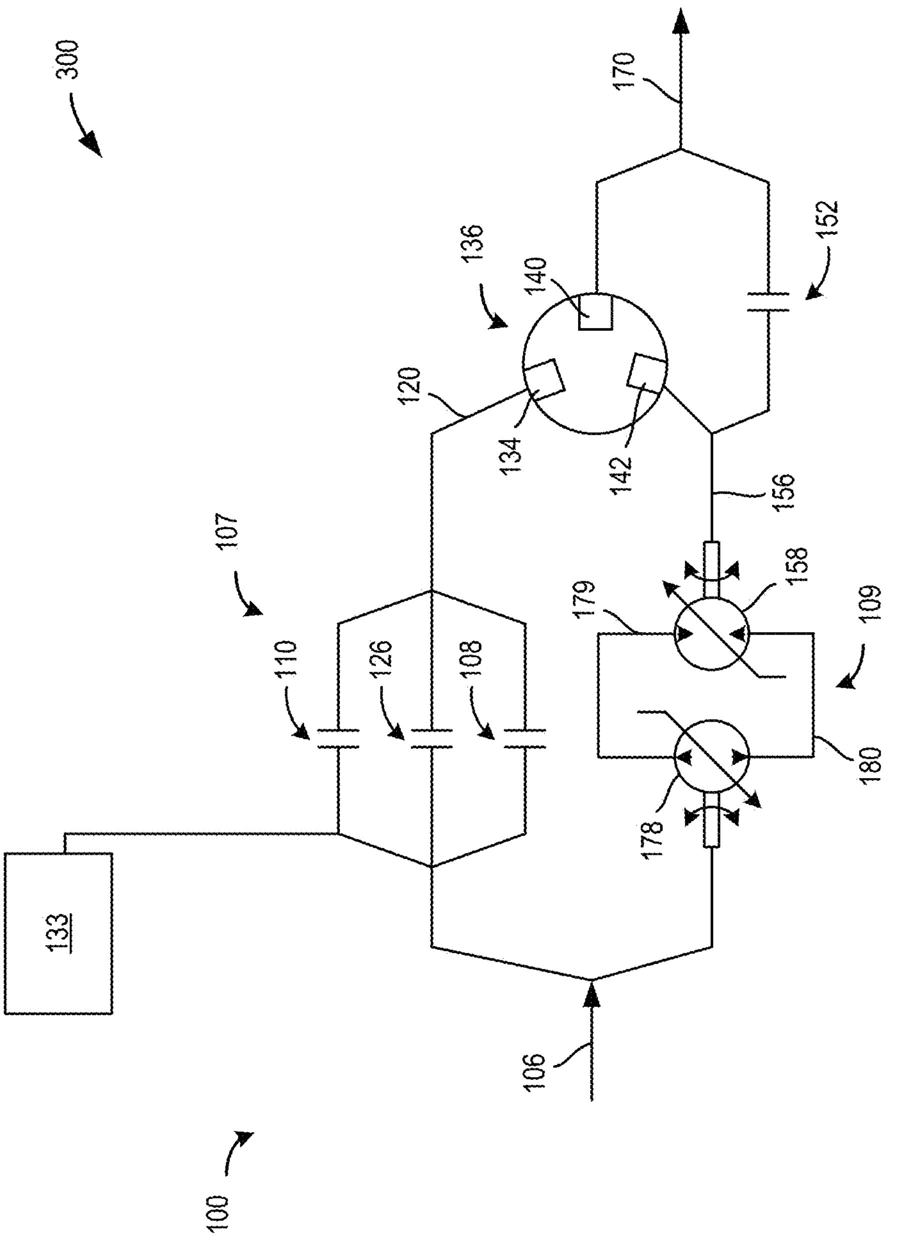
FIG. 3 shows a schematic representation of an example of the hybrid HVT of FIG. 1 with a dog clutch in a first position.
Figure 4:
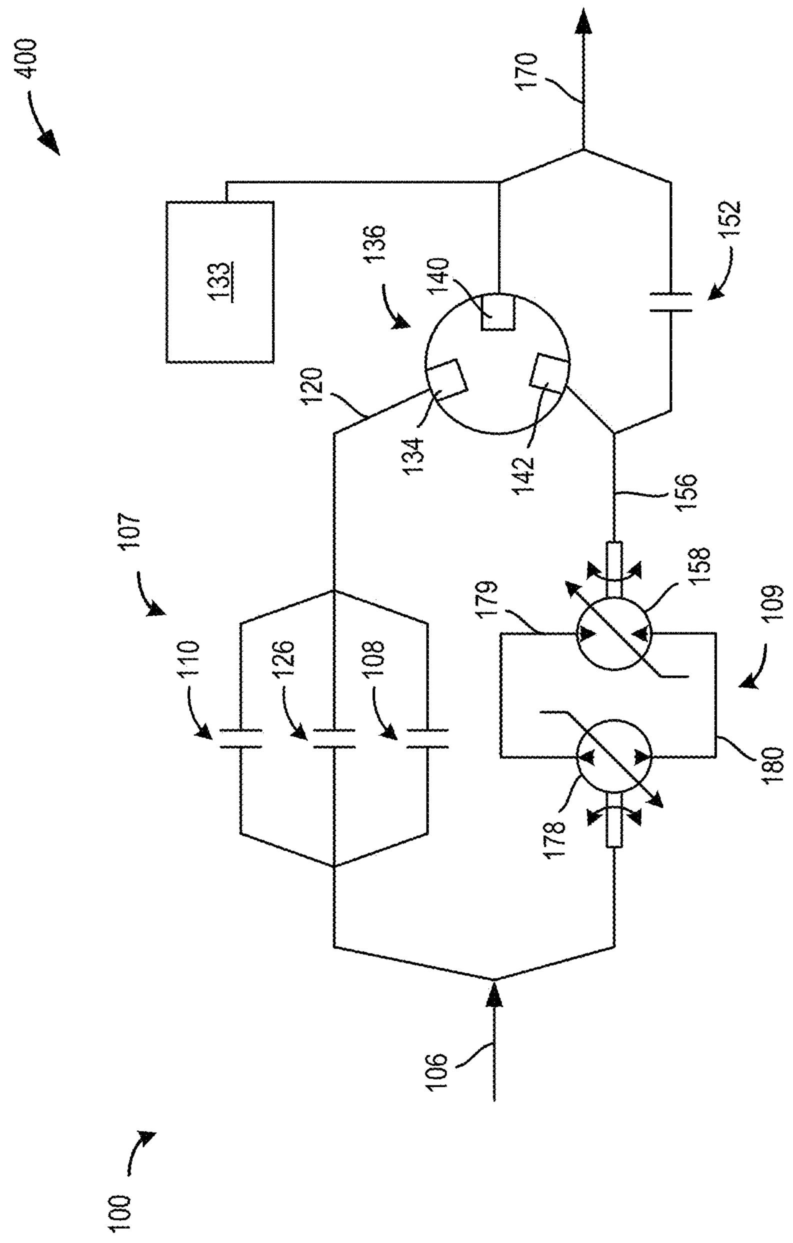
FIG. 4 shows a schematic representation of the hybrid HVT with the dog clutch in a second position.
Figure 5:
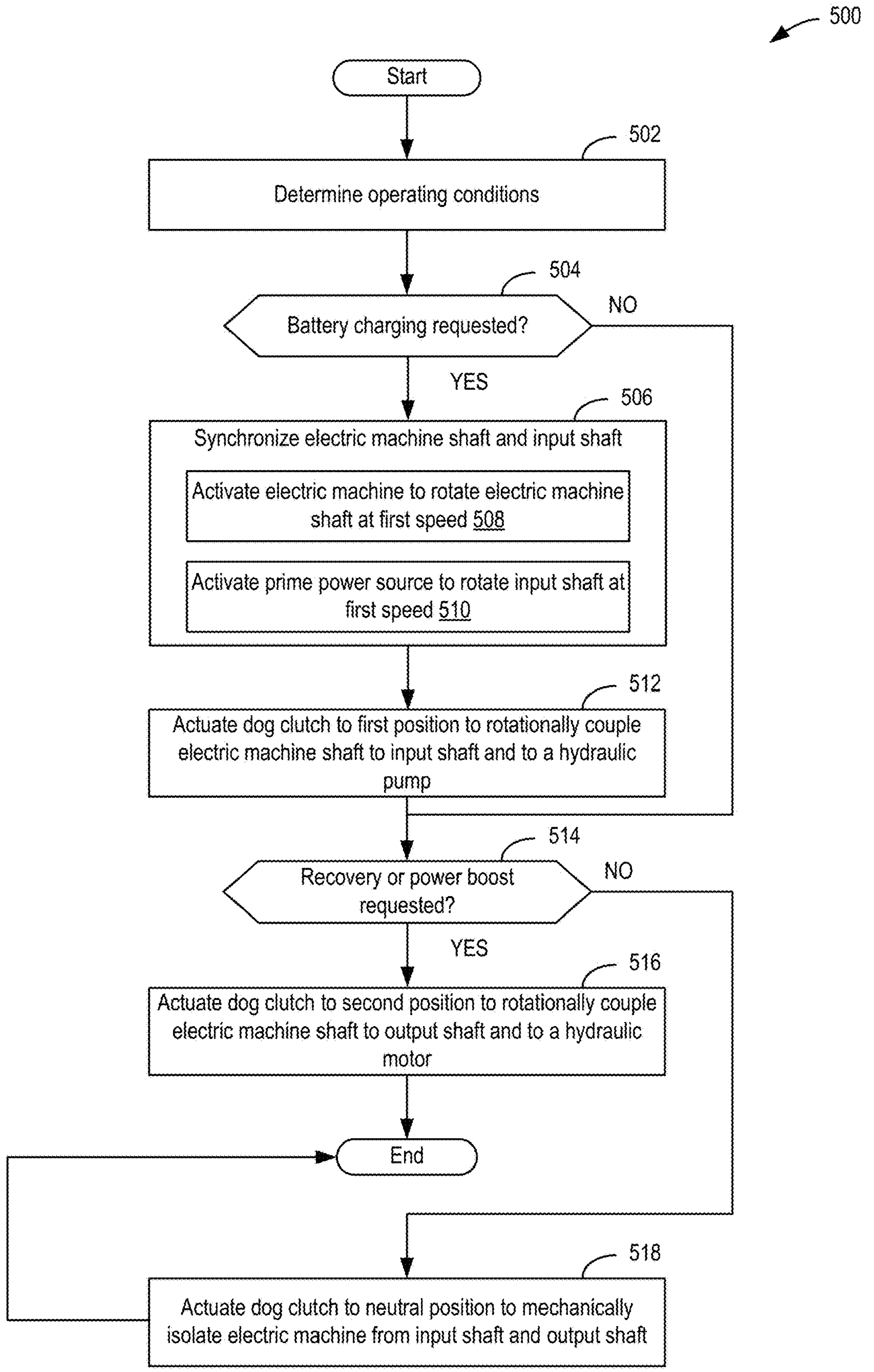
FIG. 5 shows a method for operation of a hybrid HVT.
Figure 6:
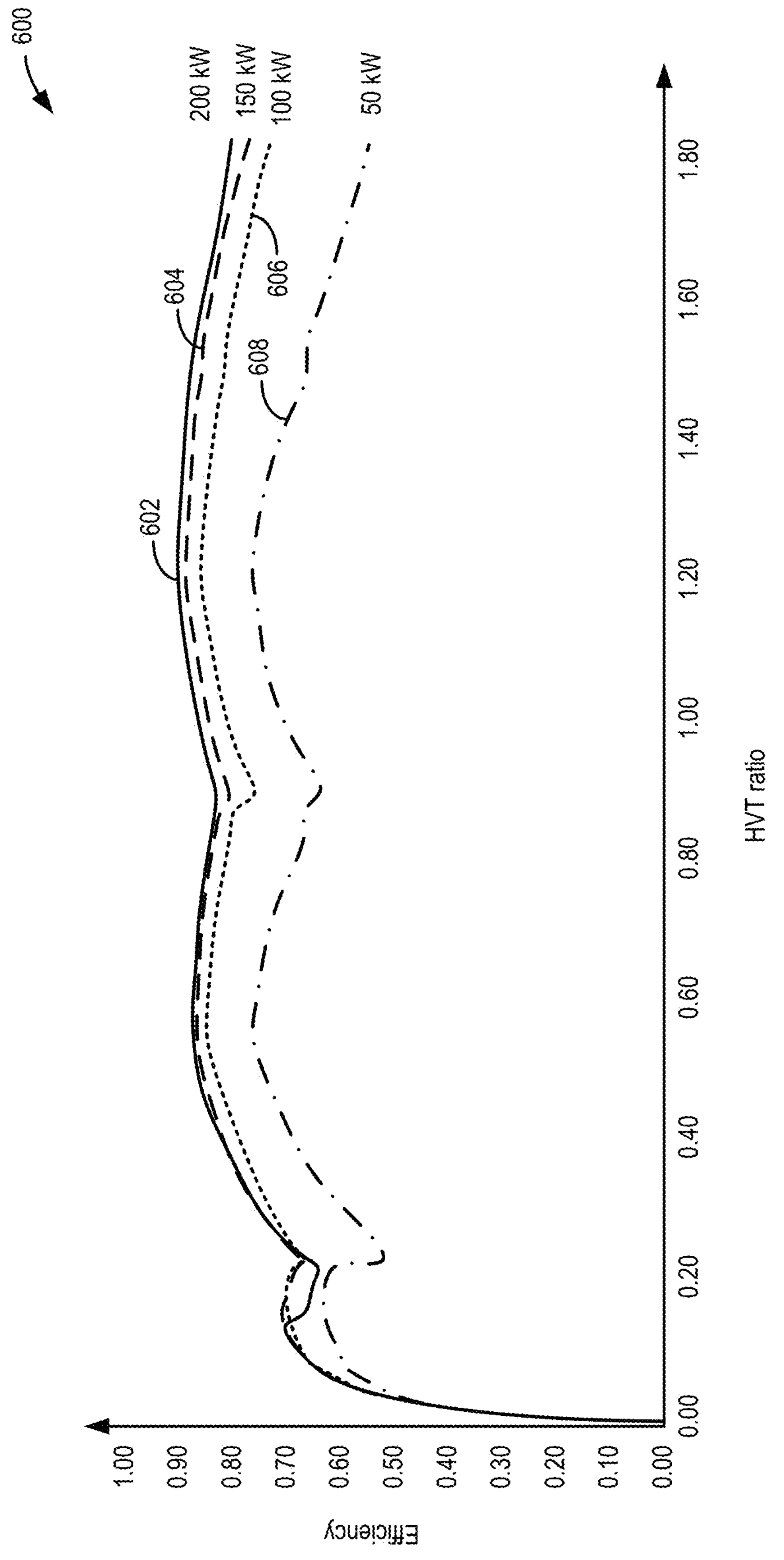
FIG. 6 shows a graphical depiction of a transmission efficiency vs. mechanical ratio in a hydromechanical transmission.

A hybrid hydromechanical variable transmission (HVT) and method for operation of the hybrid HVT is described herein. The hybrid HVT includes a variable displacement hydraulic motor and a variable displacement hydraulic pump in a hydrostatic assembly, a prime power source, and an electric machine. The electric machine is selectively rotationally coupled to the prime power source, the hydrostatic assembly, and/or an output of the transmission system via selective engagement of a dog clutch. FIG. 1 shows a schematic representation of a vehicle with a hybrid HVT. FIG. 2A shows a table which indicates the configuration of clutches in the hybrid HVT, shown in FIG. 1, in different drive ranges. FIG. 2B shows a table which indicates engagement of a dog clutch of the hybrid HVT of FIG. 1 in different energy management strategies. FIG. 3 shows a schematic representation of an example of the hybrid HVT of FIG. 1 with the dog clutch in a first position, and FIG. 4 shows a schematic representation of the hybrid HVT with the dog clutch in a second position. FIG. 5 shows a method for operation of a hybrid HVT. FIG. 6 shows a graphical depiction of a transmission efficiency vs. mechanical ratio in a conventional hydromechanical transmission.

FIG. 1 shows a schematic depiction of a transmission system 100 in a vehicle 102 or other suitable machine platform. The transmission system 100 is an example of a hybrid HVT. It will be understood that the transmission system 100 includes a transmission 103. In one example, the vehicle 102 may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable or suggested speed, for example. Industries and their corresponding operating environments in which the vehicle 102 may be deployed include construction, forestry, mining, agriculture, and the like. In either case, the vehicle 102 may be designed with auxiliary systems driven via hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission system 100 can achieve a comparatively high level of adaptability and efficiency in relation to transmissions which operate in discrete ratios.

The transmission system 100 may have asymmetric maximum output speeds for forward and reverse direction. This forward-reverse speed asymmetry may enable the transmission system 100 to achieve a desired breadth of speed ranges. However, other suitable output speed variations have been contemplated, such as symmetric output speeds in the forward and reverse directions, which may however, demand the use of one or more additional clutch(es) which may increase system complexity.

The transmission system 100 may include or receive power from a prime power source 104 and/or an electric machine 133. The prime power source 104 may include an internal combustion engine (ICE), diesel engine, electric machine (e.g., electric motor-generator), combinations thereof, and the like. When the prime power source 104 is an electric machine, the electric machine 133 may be an electric machine of the same or a different size, power capacity, fuel type, and/or other configuration. The electric machine 133 may be coupled to an inverter 135 and a battery 137. The battery 137 may be configured to store power from the electric machine 133 and/or from another power source (e.g., the prime power source 104). For example, the battery 137 may be a rechargeable battery. Power stored in the battery 137 may be used in combination with and/or independent of power from the electric machine 133 and/or the prime power source 104 to power rotation of the output shaft 170 via the transmission 103. For example, the inverter 135 may pull and convert power from the battery 137 into a form that is useable by the electric machine 133 to power the electric machine 133 (e.g., direct current (DC) to alternating current (AC)). The inverter 135 may additionally direct power from the electric machine 133 to the battery 137 to be stored.

Gears, such as bevel gears, may be used to rotationally couple the prime power source 104 to an input shaft 106. The input shaft 106 may be included in a multi-speed gearbox 107 along with the gears, clutches, other shafts, and the like described in greater detail herein. This gearbox may be conceptually included in a mechanical branch of the transmission that may be coupled with a hydrostatic assembly 109, in parallel. It will be understood, that the multi-speed gearbox 107 serves as a mechanical input during drive operation. However, during other system modes, mechanical power may flow through this gearbox interface in the opposite direction.

As described herein a parallel attachment between components, assemblies, and the like denotes that the input and output of the two components or grouping of components are coupled (e.g., rotationally coupled) to one another such that power (e.g., mechanical power in the case of mechanical attachment) flows therebetween. This parallel arrangement allows power to recirculate through the hydrostatic assembly, during some conditions, or be additively combined from the mechanical branch and the hydrostatic branch, during other conditions. As a result, the transmission's adaptability is increased, which allows gains in operating efficiency to be realized, when compared to purely hydrostatic transmissions.

Further, as described herein, a gear may be a mechanical component which rotates and includes teeth that are profiled to mesh with teeth in one or more corresponding gears to form a mechanical connection that allows rotational energy transfer therethrough. Further, the input and output shafts of the transmission are described with regard to a drive range where the prime power source 104 and/or the electric machine 133 is transferring mechanical power to the transmission and in turn the transmission is transferring mechanical power to downstream component such as axles, drive wheels, and the like.

The transmission system 100 further includes a reverse clutch 108 and a second drive range clutch 110. The reverse clutch 108 and second drive range clutch 110 as well as the other clutches described herein may be friction clutches (e.g., wet friction clutches) and therefore may include plates (e.g., friction plates and separator plates) that frictionally engage one another during clutch engagement. During partial engagement or disengagement these plates are allowed to slip, thereby allowing the torque transfer through the clutch to be selectively augmented. Further, the plurality of clutches described herein may be hydraulically and/or electro-mechanically actuated. For instance, the plurality of clutches may include pistons 194 that adjust clutch engagement/disengagement responsive to adjustment of hydraulic fluid pressure in a piston chamber. Valves (e.g., hydraulic control valves) that may be electronically controlled, such as via a solenoid, may be used to adjust the pressure supplied to the plurality of clutches hydraulic actuator (e.g., the piston assembly). The plurality of clutches may further include drums, separators, carriers, and the like.

The reverse clutch 108 and the second drive range clutch 110 may be designed to selectively engage a gear 112 that is arranged on the input shaft 106. To elaborate, engagement of the second drive range clutch 110 may couple the gear 112 for rotation with a gear 114. The gear 114 may mesh with a gear 122 that meshes with a gear 124 which rotates with a shaft 120. Engagement of the reverse clutch 108 may couple the gear 112 for rotation with a gear 116. The gear 116 may be coupled to a gear 118 that rotates with the shaft 120. As such, the gears 118 and 124 may be fixedly coupled or otherwise attached for rotation with the shaft 120. In this way, the reverse clutch 108 and the second drive range clutch 110 may deliver torque to the shaft 120 in opposite directions. A third drive range clutch 126 is positioned coaxial to the shaft 120 and is designed to selectively engage the gear 118 and a gear 128 which is coupled to the gear 112.

A gear 130 that may be fixedly attached to the shaft 120 for rotation therewith may mesh with a gear 132. The gear 132 may be coupled via a shaft or suitable structure to a ring gear 134 in a planetary gear set 136. The ring gear 134 may be rotationally coupled to one or more clutches (e.g., the third drive range clutch 126, the reverse clutch 108, the second drive range clutch 110) that are connected with the input shaft 106.

The planetary gear set 136 may be a simple planetary gear set, although more complex planetary assemblies may be used, in other examples. As such, the planetary gear set 136 may include planet gears 138 that rotate on a carrier 140 and a sun gear 142. The sun gear 142 may be fixedly coupled to a shaft 144 for rotation therewith. A gear 146 may be fixedly coupled for rotation with the shaft 144. The gear 146 may be coupled to a gear 148. The mechanical connection between these gears is signified via a dotted line and may be established via suitable mechanical components such as shafts, joints, and the like. The gear 148 may mesh with a gear 150 that is coupled to a first drive range clutch 152.

The first drive range clutch 152 is designed to selectively permit torque transfer from the gear 150 to a shaft 160. A gear 162 coupled to the carrier 140 may mesh with another gear 164 on the shaft 160. Yet another gear 166 on the shaft 160 may mesh with a gear 168 on an output shaft 170 that functions as a connection for downstream components such as drive wheels 172, 173. For example, the drive wheels 172, 173 may be mounted on and/or coupled to drive axles that are rotationally coupled to the output shaft 170. Thus, the carrier 140 is rotationally coupled to the output shaft 170 and downstream components. To elaborate, mechanical interfaces 174, 175 (e.g., yokes, joints, and the like) may connect the output shaft 170 to the drive wheels 172, 173. Arrows 176, 177 denote the mechanical power transfer between the drive 172, 173 and the mechanical interfaces 174, 175. A driveline with a shaft, joints, and the like may be used to carry out the mechanical power transfer between the transmission and the axles.

The transmission system 100 further includes a dog clutch 129 that is selectively coupled to a shaft 127 for rotation therewith. The shaft 127 may be an output shaft of the electric machine 133, and may be referred to herein as an electric machine shaft. The dog clutch 129 may include a plurality of toothed gears that are selectively coupled to a body 131 of the dog clutch 129. For example, the body 131 of the dog clutch 129 may be fixedly coupled to the shaft 127 for rotation therewith. A first toothed gear 123 and a second toothed gear 125 of the dog clutch 129 may be selectively coupled to the body 131 of the dog clutch 129. Each of the first toothed gear 123 and the second toothed gear 125 may be radially arranged around the shaft 127 and may each be supported by at least a bearing assembly allowing each toothed gear to rotate freely on the shaft 127. The dog clutch 129 may be selectively engaged, for example via valves and hydraulically controlled pistons 194, to couple the first toothed gear 123 or the second toothed gear 125 to the shaft 127.

Selective engagement of the dog clutch 129 assists in energy management of the transmission system 100. The dog clutch 129 is engaged in a first position when the first toothed gear 123 is engaged with the body 131 of the dog clutch 129. The first toothed gear 123 is thus coupled to the shaft 127 for rotation therewith when the dog clutch 129 is in the first position. A gear 121 is fixedly attached to the input shaft 106 for rotation therewith. The first toothed gear 123 is meshed with the gear 121. Thus, when the dog clutch 129 is engaged in the first position, the shaft 127 and the input shaft 106 are rotationally coupled. The electric machine 133 is directly coupled to the prime power source 104. In some examples, the prime power source 104 may be used as a generator to charge the battery 137 when the dog clutch 129 is engaged in the first position. For example, in heavy vehicle applications where idle time share plays a more significant role in material handling than in light vehicle applications, the prime power source 104 may be used to charge the battery 137 during a time where the prime power source 104 is not being operated for powering motion of the vehicle by engaging the dog clutch 129 to the first position.

Power may flow from the prime power source 104 along the input shaft 106, to the dog clutch 129 via the gear 121, and to the battery 137 via the inverter 135. Power flows from the prime power source 104 to the electric machine 133 via the input shaft 106, and vice-versa. By engaging the dog clutch 129 to the first position, a power flow path of the transmission system 100 enables the battery 137 of the transmission system 100 to be charged while also positioning an energy source (e.g., the electric machine 133, the prime power source 104) in close proximity to the input shaft 106 and/or the battery 137 (e.g., with few gears, shafts, clutches, etc. therebetween) to minimize power losses. Power used to charge the battery 137 does not flow through the hydrostatic assembly 109, which is the most dissipative subsystem of the transmission system 100 in terms of efficiency. In this way, power losses may be further reduced. Engagement of the dog clutch 129 in the first position is further described with respect to FIGS. 2B, 3, and 5.

The dog clutch 129 is engaged in a second position when the second toothed gear 125 is engaged with the body 131 of the dog clutch 129. The second toothed gear 125 is thus coupled to the shaft 127 for rotation therewith when the dog clutch 129 is in the second position. The second toothed gear 125 is further meshed with the gear 162 that is coupled to the carrier 140. Thus, when the dog clutch 129 is engaged in the second position, the shaft 127 is rotationally coupled to the carrier 140 of the planetary gear set 136, and is further rotationally coupled to the output shaft 170 via the gear 164, the shaft 160, the gear 166, and the gear 168. Power may flow from the prime power source 104 and the electric machine 133 to the output shaft 170, and vice-versa. In further examples, power flows from the electric machine 133 to the output shaft 170 and vice-versa, and may not flow to/from the prime power source 104. For example, the electric machine 133 is coupled to drive wheels 172, 173 that are rotationally mounted on the output shaft 170. Engagement of the dog clutch 129 in the second position is used to boost tractive effort of the transmission system 100, and thus of the vehicle 102, and/or to recover energy when the vehicle 102 is slowing and/or braking. Engagement of the dog clutch 129 in the second position is further described with respect to FIGS. 2B and 4-5.

When the dog clutch 129 is in a neutral position, neither the first toothed gear 123 nor the second toothed gear 125 may be engaged with the body 131 of the dog clutch 129. With the dog clutch 129 in the neutral position, the electric machine 133 may be mechanically isolated from other components of the transmission system 100 (e.g., from the input shaft 106 and the output shaft 170).

The hydrostatic assembly 109 includes a hydraulic motor 158 and a hydraulic pump 178 (e.g., variable displacement bi-directional pump). The hydraulic motor 158 may be an axial piston variable motor such as a rotary type motor with an axial-tapered piston and a bent-axis design, for instance. More generally, the hydraulic motor 158 is a variable displacement motor. Further, the hydraulic pump 178 may be an axial piston pump, in one instance. To elaborate, the axial piston pump may include a swash plate that interacts with pistons and cylinders to alter the pump's displacement via a change in swivel angle, in one specific example.

However, other suitable types of variable displacement bi-directional pumps have been contemplated.

The hydraulic motor 158 and the hydraulic pump 178 may be hydraulically coupled in series. Specifically, hydraulic lines 179, 180 are attached to hydraulic interfaces in each of the hydraulic motor 158 and the hydraulic pump 178 to enable the hydrostatic assembly 109 to provide additive power recirculation functionality with regard to a mechanical branch that is formed in the multi-speed gearbox 107 and coupled to (e.g., arranged in parallel with) the hydrostatic assembly 109. A mechanical interface 156 of the hydraulic motor 158 may be coupled to a gear 154. The gear 154 may further be coupled to the gear 148. The mechanical connection between these gears is signified via a dotted line and may be established via suitable mechanical components such as shafts, joints, and the like. Thus, the sun gear 142 is rotationally coupled to the hydraulic motor 158.

In an additive power mode, power from both the hydrostatic and mechanical assemblies is combined at the planetary gear set 136 and delivered to the shaft 160. Therefore, the hydraulic pump 178 and the hydraulic motor 158 may be operated to flow power to the planetary gear set 136. In a recirculating power mode, power is recirculated through the hydrostatic assembly 109 to the input of the multi-speed gearbox 107. Therefore, in the recirculating power mode, power flows from the hydrostatic assembly 109 to the gear 112.

The coupling of the hydrostatic assembly 109 to the multi-speed gearbox 107 enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

A gear 184 coupled to the gear 116 may be rotationally attached to a charging pump 185. The charging pump 185 may be designed to deliver pressurized fluid to hydraulic components in the transmission such as the hydraulic motor 158, the hydraulic pump 178, and the like. The fluid pressurized by the charging pump 185 may additionally be used for clutch actuation and/or transmission lubrication. The charging pump 185 may include a piston, a rotor, a housing, chamber(s), and the like to allow the pump to move fluid. The hydraulic pump 178 is rotationally coupled with the input shaft 106 via the gear 112 and the gear 184.

A first mechanical PTO 181 and/or a second mechanical PTO 182 may be coupled to a gear 183. In turn, the gear 183 may be mechanically coupled to the gear 112. The mechanical PTOs 181, 182 may drive auxiliary systems such as a pump (e.g., a hydraulic pump, a pneumatic pump, and the like), a winch, a boom, a bed raising assembly, and the like. To accomplish the power transfer to auxiliary components, the mechanical PTOs may include an interface, shaft(s), housing, and the like. However, in other examples, the mechanical PTOs 181, 182 may be omitted from the transmission system 100. Another PTO 169 may be rotationally coupled to the hydraulic pump 178.

Including the dog clutch 129, the planetary gear set 136, the reverse clutch 108, the second drive range clutch 110, the third drive range clutch 126, and the first drive range 152 in the transmission system 100 enables the transmission system 100 to have a compact design (e.g., relatively small footprint in the vehicle 102) and provide a desired number of available drive ranges. The dog clutch 129 may be adjusted among different positions to selectively rotationally couple the electric machine 133 to the input shaft 106, or to the output shaft 170 via the carrier 140 of the planetary gear set 136. The dog clutch 129 may further be actuated to rotationally isolate the electric machine 133 from the transmission system 100 such that the electric machine 133 is mechanically free and does not output nor receive rotational power. In this way, the dog clutch 129 may be actuated to adjust power flow paths of the transmission system 100.

A control system 186 with a controller 187 (e.g., transmission control unit (TCU), vehicle electronic control unit (ECU), combinations thereof, and the like) may further be incorporated in the transmission system 100. The controller 187 includes a processor 188 and memory 189. The memory 189 may hold instructions stored therein that when executed by the processor cause the controller 187 to perform the various methods, control strategies, etc., described herein. The processor 188 may include a microprocessor unit and/or other types of circuits. The memory 189 may include known data storage mediums such as random access memory, read only memory, keep alive memory, combinations thereof, and the like.

The controller 187 may receive vehicle data and/or various signals from sensors positioned in different locations in the transmission system 100 and/or the vehicle 102. The sensors may include gear speed sensors 191, 192, 195 which detect the speed of gear 130, gear 164, and gear 183, respectively. In this way, gear speed at the input and the output of the system may be detected along with the gear speed at the input of the planetary gear set 136. Speeds of elements of the dog clutch 129 (e.g., the first toothed gear 123, the second toothed gear 125, the body 131) may be derived from measurements of the sensors 192 and 195. The electric machine 133 may further include a speed sensor that detect the speed of the shaft 127. In other examples, the speeds of at least a portion of the gears and/or shafts may be modeled by the controller.

The controller 187 may send control signals to an actuator in the hydraulic pump 178 or an actuation system coupled to the pump 178 to adjust the output volume, speed, and/or direction of hydraulic fluid flow. Specifically, the controller may send signals to the pump to adjust its swash plate angle. Additionally, one or more of the reverse clutch 108, second drive range clutch 110, third drive range clutch 126, first drive range clutch 152, and the dog clutch 129 (collectively, "the plurality of clutches") may receive commands (e.g., opening or closing commands) from the controller 187 and actuators in the plurality of clutches or actuation systems coupled to the plurality of clutches may adjust the state of the clutch in response to receiving the command.

In one specific example, the plurality of clutches may be actuated via valves and hydraulically controlled pistons 194 that are included in a hydraulic control system 193, although other suitable clutch actuation systems have been envisioned such as electromechanical actuation systems and/or pneumatic actuation systems. The hydraulic control system 193 may include valves 197 that adjust the flow or pressure of hydraulic fluid supplied to the plurality of clutches (e.g., the control pistons) for actuation. The hydraulic control system 193 may further include hydraulic lines and a pump, in one example. Alternatively, the charging pump 185 may supply pressurized hydraulic fluid (e.g., oil) to the hydraulic control system or be included therein. The hydraulic control system 193, which may be in the form of a hydraulic circuit separate from the clutch control circuit, may further be configured to control the hydraulic motor 158 and/or the hydraulic pump 178. For instance, a solenoid 198 may be used to control the displacement of the hydraulic motor 158, in one example. In such an example, the displacement of the motor is proportional to the current provided to the solenoid.

The other controllable components in the transmissions system include the hydraulic pump 178, the hydraulic motor 158, the prime power source 104, the electric machine 133, and the like. These controllable components may function similarly with regard to receiving control commands and adjusting an output and/or a state of a component responsive to receiving the command via an actuator. Additionally or alternatively, an ECU may be provided in the vehicle to control the power source (e.g., engine and/or motor). Furthermore, the control system 186 and specifically the controller 187 with the memory 189 and processor 188 may be configured to carry out the energy management control strategies elaborated upon herein with regard to FIG. 5.

The transmission system 100 may include an input device 190 (e.g., an accelerator pedal, a control-stick, levers, buttons, combinations thereof, and the like). The input device 190, responsive to driver input, may generate a transmission speed or torque adjustment request and a desired drive direction (e.g., a forward or reverse drive direction). Further, the transmission system 100 may automatically switch between drive ranges when demanded. To elaborate, the operator may request a forward or reverse drive range speed or torque change, and the transmission may increase speed or torque and automatically transition between the drive ranges associated with the different drive ranges, when desired (e.g., when the transmission approaches a desired shift point). Further, in one example, the operator may request reverse drive operation while the vehicle 102 is operating in a forward drive range. In such an example, the transmission may automatically initiate a transition between the forward and reverse drive ranges. In this way, the operator may more efficiently control the vehicle 102. It will further be appreciated that the prime power source 104 and/or the electric machine 133 may be controlled in tandem with the transmission 103. For instance, when a speed or torque adjustment request is received by the controller, the output speed and/or torque of the prime power source 104 and/or the electric machine 133 may be correspondingly increased.

The transmission system 100 may additionally include a lubrication system which may include a sump, as previously discussed. The lubrication system may further include conventional components for lubricating the gears and/or the plurality of clutches such as pumps, conduits, valves, and the like.

An axis system is provided in FIG. 1 for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2A shows a chart 200 that illustrates the configurations (engaged or disengaged) of the plurality of clutches 108, 110, 126, 152 shown in FIG. 1 in the different drive ranges (a first forward drive range, a second forward drive range, a third forward drive range, a first reverse drive range, a second reverse drive range, and a third reverse drive range).

In the first forward drive range, the first drive range clutch 152 is engaged, and the second drive range clutch 110, the third drive range clutch 126, and the reverse clutch 108 are disengaged. In the second forward drive range, the second drive range clutch 110 is engaged, and the first drive range clutch 152, the third drive range clutch 126, and the reverse clutch 108 are disengaged. In the third forward drive range, the third drive range clutch 126 is engaged, and the first drive range clutch 152, the second drive range clutch 110, and the reverse clutch 108 are disengaged.

In the first reverse drive range, the first drive range clutch 152 and the reverse clutch 108 are engaged while the second drive range clutch 110 and the third drive range clutch 126 are disengaged. In the second reverse drive range, the reverse clutch 108 and the second drive range clutch 110 are engaged while the first drive range clutch 152 and the third drive range clutch 126 are disengaged. In the third reverse drive range, the reverse clutch 108 and the third drive range clutch 126 are engaged while the first drive range clutch 152 and the second drive range clutch 110 are disengaged.

FIG. 2B shows a chart 250 that illustrates selective engagement of the dog clutch 129 (of the transmission system 100 shown in FIG. 1) in different energy management strategies. When the dog clutch 129 is engaged in the first position (e.g., the first toothed gear 123 is engaged with the body 131), the electric machine 133 is coupled with the prime power source 104. With the dog clutch 129 engaged in the first position, the transmission system 100 may be in a configuration that enables efficient charging of the battery 137, where energy is delivered to the battery 137 via the electric machine 133. The position of the dog clutch 129 may be adjusted independent of the transmission drive ranges described in FIG. 2A. Energy may be delivered to the battery 137 when the dog clutch 129 is in the first position regardless of engagement states of the plurality of clutches.

When the dog clutch 129 is engaged in the second position (e.g., the second toothed gear 125 is engaged with the body 131), the electric machine 133 is coupled with drive wheels 172, 173 of the transmission system 100. With the dog clutch 129 engaged in the second position, the transmission system 100 may be in a configuration that enables both energy recovery and power boost. For example, a negative (e.g., recovery) tractive effort may be demanded, and engagement of the dog clutch 129 in the second position enables capture of braking power from the drive wheels 172, 173. In another example, a positive (e.g., power boost) tractive effort may be demanded, and engagement of the dog clutch 129 in the second position enables power to be delivered to the drive wheels 172, 173 from both the electric machine 133 and the prime power source 104.

FIG. 3 shows a schematic depiction 300 of the transmission system 100 with a higher level architecture than is depicted in FIG. 1. In the depiction 300 shown in FIG. 3, at least a portion of components of the transmission system 100 as well as the other transmission systems described herein may have similar structure and/or functionality to components included in the transmission system 100, depicted in FIG. 1. Redundant description is therefore omitted for brevity. In FIG. 3, the dog clutch 129 (not shown) is engaged in the first position such that the electric machine 133 is coupled to the prime power source 104 (e.g., rotationally coupled to the input shaft 106).

The input shaft 106 and the electric machine 133 are coupled to the shaft 120 via engagement of one or more of the reverse clutch 108, the second drive range clutch 110, and the third drive range clutch 126. The input shaft 106 is further coupled to the mechanical interface 156 via the hydrostatic assembly 109. Combined power from the electric machine 133 and the prime power source 104 (not shown in FIG. 3) is further combined with power from the hydrostatic assembly 109 at the planetary gear set 136. The transmission system 100 may provide power to wheels when the dog clutch 129 is in the first position, where power provided to the wheels is combined power from the electric machine 133 and the prime power source 104. For example, power from the shaft 120 enters the planetary gear set 136 at the ring gear 134, power from the mechanical interface 156 enters the planetary gear set 136 at the sun gear 142, and combined power from the electric machine 133, the prime power source 104, and the hydrostatic assembly 109 is output to the output shaft 170 via the carrier 140. In some examples, the first drive range gear 152 is engaged, and power from the hydrostatic assembly 109 bypasses the planetary gear set 136 and is output to the output shaft 170 via the first drive range gear 152. Alternatively, the transmission system 100 may absorb power from the wheels during a braking phase by combining electric regenerative braking (e.g., to recharge batteries) and prime power source dissipative braking, either together or individually. In this way, different combinations of power from the electric machine 133, the prime power source 104, and the hydrostatic assembly 109 may be delivered to the output shaft 170 via different combinations of clutch engagements.

FIG. 4 shows a schematic depiction 400 of the transmission system 100 with a higher level architecture than is depicted in FIG. 1. In the depiction 400 shown in FIG. 4, at least a portion of components of the transmission system 100 as well as the other transmission systems described herein may have similar structure and/or functionality to components included in the transmission system 100, depicted in FIG. 1. Redundant description is therefore omitted for brevity. In the view of FIG. 4, the dog clutch 129 (not shown) is engaged in the second position such that the electric machine 133 is rotationally coupled to the output shaft 170.

The input shaft 106 is coupled to the shaft 120 via engagement of one or more of the reverse clutch 108, the second drive range clutch 110, and the third drive range clutch 126. Similar to the schematic depiction 300 of FIG. 3, the input shaft 106 is further coupled to the mechanical interface 156 via the hydrostatic assembly 109. Power from the hydrostatic assembly 109 is directed to the output shaft 170 via the planetary gear set 136 (e.g., via the sun gear 142) and/or via engagement of the first drive range gear 152. Power from the hydrostatic assembly 109 and the prime power source 104 (e.g., via the input shaft 106) may be combined at the planetary gear set 136. Combined power is output from the planetary gear set 136 at the carrier 140. When the dog clutch 129 is in the second position, the electric machine 133 is rotationally coupled to the carrier 140. Thus, power from the electric machine 133 may be added to the combined power output by the planetary gear set 136. In further examples, the prime power source 104 may be powered off and may not provide power to the output shaft 170. Engagement of the dog clutch 129 in the second position couples the electric machine 133 to the transmission system 100 in such a way that the electric machine 133 may provide power to the output shaft 170 independent of the prime power source 104. Further, the transmission system 100 may absorb power from the drive wheels 172, 173 during braking operation by combining electrical regenerative braking and dissipative braking of the prime power source 104. Absorbed power may be used to charge the battery 137 (not shown). In this way, different combinations of power from the electric machine 133, the prime power source 104, and the hydrostatic assembly 109 may be delivered to the output shaft 170 via different combinations of clutch engagements.

FIG. 5 shows a method 500 for operation of a transmission system. The method 500 describes actuation of a dog clutch of the transmission system to execute different energy management strategies for a vehicle in which the transmission system is implemented. The method 500 and/or the other methods and control techniques described herein may be carried out by any of the transmissions and components described above with regard to FIGS. 1-3 or combinations thereof, in one example. However, in other examples, the method 500 and/or the other methods may be implemented using other suitable transmissions and corresponding components. Further, the method 500 and the other methods, control strategies, and the like may be carried out as instructions stored in non-transitory memory executed by a processor in a controller. As such, performing the method steps may include sending and/or receiving commands which trigger adjustment of associate components, as previously indicated. The configuration of the transmission system and methods described herein enables regenerative braking and use of an electric machine of the transmission system to store kinematic energy in a battery and selectively used stored power. Compared to conventional transmission systems where kinematic energy is dissipated/lost by the prime power source, this reduces power losses of the transmission system.

At 502, the method 500 includes determining operating conditions. The operating conditions may include hydraulic motor speed, hydraulic motor speed set-point, hydraulic pump torque, hydraulic pump torque set-point, hydrostatic unit differential pressure, transmission speed, transmission load, transmission torque, vehicle speed, operator torque request, operator speed request, prime power source speed, prime power source load, clutch positions, ambient temperature, transmission temperature, battery state of charge, tractive effort demand, and the like. These operating conditions may be determined using sensor data and/or modeling algorithms.

At 504, the method 500 includes determining if battery charging is requested (e.g., determining if a battery charge request is received). Battery charging may be requested when power that is output by the electric machine and/or the prime power source is greater than a power demand of the transmission system. For example, an input device may generate a transmission speed request (e.g., power demand) responsive to driver input, where the transmission speed request is less than the current transmission speed as determined at operation 502. Excess power may be used to charge the battery. Battery charging may further be requested when a battery state of charge (SOC) is less than a non-zero threshold. For example, the battery SOC threshold may be 30% of a maximum capacity of the battery. Responsive to determination that battery charging is requested (YES at 504), the method 500 includes synchronizing the electric machine shaft and the input shaft at 506 to enable rotational coupling of the electric machine shaft to the input shaft and to the hydraulic pump. For example, a differential speed between the input shaft and electric machine shaft may be zeroed.

At 508, the method 500 includes commanding activation of the electric machine to rotate the electric machine shaft thereof to rotate at a first speed. At 510, the method 500 further includes commanding activation of the prime power source to rotate the input shaft at the first speed. At 512, the method 500 includes actuating the dog clutch to the first position to rotationally couple the electric machine shaft to the input shaft and to the hydraulic pump. An example schematic diagram of the transmission system with the dog clutch engaged to the first position is shown in FIG. 3.

At 504, if it is determined that battery charging is not requested (NO at 504), the method 500 proceeds to 514 and does not include synchronizing the electric machine shaft and the input shaft, nor actuating the dog clutch to the first position. Battery charging may not be requested when the battery SOC is greater than the battery SOC threshold, and/or when power that is output by the electric machine and/or the prime power source is less than or equal to the power demand of the transmission system.

At 514, the method 500 includes determining if a recovery (e.g., negative) tractive effort or a power boost (e.g., positive) tractive effort is requested (e.g., determining if a power boost request or power recovery request is received). Recovery tractive effort may be requested during vehicle slowing and/or braking. Power boost tractive effort may be requested when power output by the prime power source is less than the power demand (e.g., as generated by the input device). Responsive to request for recovery (e.g., negative) tractive effort or power boost (e.g., positive) tractive effort (YES at 514), the method 500 includes actuating the dog clutch to the second position to rotationally couple the electric machine shaft to the output shaft (e.g., to the drive wheels) and to the hydraulic motor at 516. Conversely, if it is determined that recovery (e.g., negative) tractive effort or power boost (e.g., positive) tractive effort is not requested (NO at 514), the method 500 proceeds to 518 and does not include actuating the dog clutch to the second position.

At 518, the method 500 includes actuating the dog clutch to the neutral position to mechanically isolate the electric machine from the input shaft and from the output shaft. Following operation 514 or operation 518, the method 500 ends.

Additionally, the dog clutch may be actuated from the neutral position to the first position or the second position, from the second position to the first position or the third position, and from the first position to the second position or the third position without departing from the scope of the present disclosure. For example, when the dog clutch is in the third position such that the electric machine is mechanically isolated as described herein, an operating mode may be requested where the vehicle is at a standstill (e.g., neither the prime power source nor the electric machine are driving movement of the vehicle), and charging of the battery is requested. The electric machine may be actuated to synchronize the electric machine shaft with the input shaft, the dog clutch may be actuated to the first position, and the electric machine may be used to brake the prime power source such that power is directed to the battery to store power.

In this way, including a dog clutch in a hybrid electric transmission system, where the dog clutch selectively couples an electric machine to the transmission system, increases an efficiency and reduces power losses of the transmission system. The transmission system described herein does not demand use of an additional engine brake system (e.g., a retarder) to brake the prime power source, as the electric machine provides additional brake capacity to the transmission system. The prime power source may be powered off in low power and torque maneuvers, and the transmission system may use an electric power source (e.g., stored power in the battery and/or the electric machine) to provide power to the output shaft. Efficiency of the transmission system is thus increased, compared to conventional transmission systems. Further, in heavy maneuvers, the transmission system is provided with a power and torque boost by engaging the dog clutch to the second position and using the electric machine to increase vehicle performance by having the electric machine power the transmission output. In cases of low power stored in the battery, and thus low power available to power the electric machine, the prime power source may be used to power the transmission system output. During idle time where the vehicle is not moving (e.g., during material handling), the dog clutch may be engaged to the first position to direct power flow to the battery to charge the battery. In cases of low energy stored in the battery, if some power is available from the prime power source (e.g., engine demand is low, such as during low and/or consistent speed travel), the dog clutch may be engaged to the first position to recharge the battery where the electric machine pulls energy from the prime power source without diminishing ability of the transmission output to power vehicle motion. To further decrease power consumption by the transmission system, the electric machine may be decoupled from the transmission system when the electric machine is not in use, by moving the dog clutch to the neutral position. The dog clutch may be engaged to the neutral position in other scenarios where it is desirable to decouple the electric machine from other elements of the transmission system, such as when the electric machine and/or elements thereof is degraded.

FIG. 6 shows a graph 600 that illustrates efficiencies of the HVT transmission described with respect to FIGS. 1-5 at different load conditions. Transmission system efficiency is plotted along a vertical axis and HVT ratio is plotted along a horizontal axis. The HVT ratio is a continuously variable transmission ratio of a power split system. The HVT ratio is controlled by two independent hydrostatic units and power flow metering through a hydrostatic branch of the HVT.

As briefly described above, a conventional HVT may have relatively high fixed power losses that result in transmission efficiency drops at lower power flows. A maximum operating power of a HVT is referred to herein as a design power of the HVT. A first plot 602 shows transmission efficiency of the HVT (e.g., the transmission system 100 of FIG. 1) at different HVT ratios when the HVT operates at the design power of the HVT, where the design power is 200 kilowatts (kW). A second plot 604 of the graph 600 shows HVT efficiency at one half of design power (e.g., 100 kW). A third plot 606 shows HVT efficiency at three quarters of design power (e.g., 150 kW). A fourth plot 608 shows HVT efficiency at one quarter of design power (e.g., 50 kW). Relative to HVT efficiency at 200 kW (e.g., at design power), HVT efficiency at 50 kW drops by approximately 10%. If the conventional HVT is a semi-power split transmission, a first fully hydrostatic gear provides a relatively low efficiency drive range, where efficiency is less than 70%. Kinematic energy that is available during a braking phase may not be recovered, and all energy is dissipated.

In the transmission described herein with respect to FIGS. 1-5, transmission efficiency is increased with respect to conventional HVT systems while maintaining advantages of a hydrostatic power split in terms of cost and power density, with respect to an electric power split transmission with the same power sizing. For example, a hybrid HVT as described herein may include two 200 kW hydraulic machines and a 100 kW electric machine, and an electric power split transmission may include two 200 kW electric machines. The hydraulic machines of the hybrid HVT provide supplementary power to the transmission that is lost in electric power split transmissions and conventional HVT (e.g., without an electric machine).

The technical effect of the transmission system and operating methods described herein is to increase transmission efficiency and reduce power losses by including in the transmission system an electric machine that is selectively rotationally coupled to the input or output of the transmission system, or is mechanically isolated, via actuation of a dog clutch.

The disclosure also provides support for a transmission system, comprising: a hydraulic pump rotationally coupled to an input shaft, a hydraulic motor rotationally coupled to an output shaft via a first drive range clutch, a planetary gear set comprising a sun gear rotationally coupled to the hydraulic motor, a carrier rotationally coupled to the output shaft, and a ring gear rotationally coupled to one or more clutches connected to the input shaft, a prime power source rotationally coupled to the input shaft, and an electric machine that is selectively rotationally coupled to the input shaft or to the output shaft, or is mechanically isolated from the input shaft and the output shaft, via actuation of a dog clutch. In a first example of the system, the electric machine is rotationally coupled to the input shaft when the dog clutch is engaged in a first position. In a second example of the system, optionally including the first example, power flows from the prime power source to the electric machine via the input shaft and vice-versa. In a third example of the system, optionally including one or both of the first and second examples, power flows from the prime power source and the electric machine to the output shaft and vice-versa. In a fourth example of the system, optionally including one or more or each of the first through third examples, the electric machine is rotationally coupled to the carrier when the dog clutch is engaged in a second position. In a fifth example of the system, optionally including one or more or each of the first through fourth examples, power flows from the electric machine to the output shaft and vice-versa. In a sixth example of the system, optionally including one or more or each of the first through fifth examples, the electric machine is mechanically isolated from the input shaft when the dog clutch is in a neutral position. In a seventh example of the system, optionally including one or more or each of the first through sixth examples, the prime power source is an internal combustion engine. In an eighth example of the system, optionally including one or more or each of the first through seventh examples, the system further comprises: a rechargeable battery that is coupled to the electric machine. In a ninth example of the system, optionally including one or more or each of the first through eighth examples, the system further comprises: a second drive range clutch and a reverse clutch both arranged on the input shaft and configured to selectively engage the input shaft with a shaft that is rotationally coupled to the planetary gear set, where engagement of the second drive range clutch directs shaft rotation in a forward direction and where engagement of the reverse clutch directs shaft rotation in a reverse direction.

The disclosure also provides support for a hybrid hydro-mechanical variable transmission (HVT) system, comprising: a hydrostatic assembly including a variable displacement hydraulic motor and a variable displacement hydraulic pump, a multi-speed gearbox mechanically coupled to the hydrostatic assembly and including a plurality of clutches configured to shift the system between a plurality of drive ranges, a planetary gear set mechanically coupled to the multi-speed gearbox, the hydrostatic assembly, and an output shaft, an electric machine selectively coupled to an input shaft of the multi-speed gearbox and to a sun gear of the planetary gear set via a dog clutch, a battery coupled to the electric machine, and, a controller including instructions stored in non-transitory memory that when executed in response to a battery charge request, cause the controller to adjust the dog clutch to a first position to rotationally couple the electric machine to an input shaft of the hybrid HVT system, and, in response to a power recovery or power boost request, cause the controller to adjust the dog clutch to a second position to rotationally couple the electric machine to the output shaft. In a first example of the system, the variable displacement hydraulic motor is hydraulically coupled in series with the variable displacement hydraulic pump. In a second example of the system, optionally including the first example, the electric machine is coupled to the variable displacement hydraulic pump when the dog clutch is engaged in the first position. In a third example of the system, optionally including one or both of the first and second examples, the electric machine is coupled to the variable displacement hydraulic motor, via the planetary gear set, when the dog clutch is engaged in the second position. In a fourth example of the system, optionally including one or more or each of the first through third examples, the variable displacement hydraulic motor is selectively rotationally coupled to the output shaft via a first drive range clutch.

The disclosure also provides support for a method for a transmission system, comprising: responsive to a battery charge request, commanding activation of an electric machine to rotate an electric machine shaft to rotate at a first speed, commanding activation of a prime power source to rotate an input shaft at the first speed, and actuating a dog clutch to a first position to rotationally couple the electric machine shaft to the input shaft and to a hydraulic pump, and, responsive to a power recovery or power boost request, actuating the dog clutch to a second position to rotationally couple the electric machine to an output shaft and to a hydraulic motor of the transmission system. In a first example of the method, the method further comprises: responsive to receiving none of the battery charge request, power recovery, or power boost request, commanding activation of the dog clutch to a neutral position to mechanically isolate the electric machine from the input shaft and the output shaft. In a second example of the method, optionally including the first example, the method further comprises: actuating a second drive range clutch arranged on the input shaft to direct power flow from the prime power source to a planetary gear set such that a shaft fixedly coupled to a sun gear of the planetary gear set rotates in a forward direction. In a third example of the method, optionally including one or both of the first and second examples, the method further comprises: actuating a reverse clutch arranged on the input shaft to direct power flow from the prime power source to a planetary gear set such that a shaft fixedly coupled to a sun gear of the planetary gear set rotates in a reverse direction. In a fourth example of the method, optionally including one or more or each of the first through third examples, the method further comprises: actuating a first drive range clutch to selectively couple the hydraulic motor to the output shaft.

FIGS. 1 and 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken to change a state of a device. The specific routines described herein may represent one or more of a variety of processing strategies. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

As used herein, the terms "approximately" may be construed to mean plus or minus three percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:

a hydraulic pump rotationally coupled to an input shaft;

a hydraulic motor rotationally coupled to an output shaft via a first drive range clutch;

a planetary gear set comprising a sun gear rotationally coupled to the hydraulic motor, a carrier rotationally coupled to the output shaft, and a ring gear rotationally coupled to one or more clutches connected to the input shaft;

a prime power source rotationally coupled to the input shaft; and an electric machine that is rotationally coupled to the input shaft when a dog clutch is engaged in a first position, is rotationally coupled to the output shaft and is directly rotationally coupled to the carrier when the dog clutch is engaged in a second position, and is mechanically isolated from the input shaft and the output shaft when the dog clutch is in a neutral position.

2. The transmission system of claim 1, wherein power flows from the prime power source to the electric machine via the input shaft and vice-versa when the dog clutch is engaged in the first position.

3. The transmission system of claim 1, wherein power flows from the prime power source and the electric machine to the output shaft and vice-versa when the dog clutch is engaged in the second position.

4. The transmission system of claim 1, wherein power flows from the electric machine to the output shaft and vice-versa when the dog clutch is engaged in the second position.

5. The transmission system of claim 1, wherein the prime power source is an internal combustion engine.

6. The transmission system of claim 1, further comprising a rechargeable battery that is coupled to the electric machine.

7. The transmission system of claim 1, further comprising a second drive range clutch and a reverse clutch both arranged on the input shaft and configured to selectively engage the input shaft with a shaft that is rotationally coupled to the planetary gear set, where engagement of the second drive range clutch directs shaft rotation in a forward direction and where engagement of the reverse clutch directs shaft rotation in a reverse direction.

8. A hybrid hydromechanical variable transmission (HVT) system, comprising:

a hydrostatic assembly including a variable displacement hydraulic motor and a variable displacement hydraulic pump;

a multi-speed gearbox mechanically coupled to the hydrostatic assembly and including a plurality of clutches configured to shift the system between a plurality of drive ranges;

a planetary gear set mechanically coupled to the multi-speed gearbox, the hydrostatic assembly, and an output shaft;

an electric machine directly rotationally coupled to an input shaft of the multi-speed gearbox via a dog clutch engaged in a first position, and directly rotationally coupled to the planetary gear set via the dog clutch engaged in a second position;

a battery coupled to the electric machine; and, a controller including instructions stored in non-transitory memory that when executed in response to a battery charge request, cause the controller to adjust the dog clutch to the first position to rotationally couple the electric machine to the input shaft; and, in response to a power recovery or power boost request, cause the controller to adjust the dog clutch to the second position to rotationally couple the electric machine to the output shaft via the planetary gear set.

9. The hybrid HVT system of claim 8, wherein the variable displacement hydraulic motor is hydraulically coupled in series with the variable displacement hydraulic pump.

10. The hybrid HVT system of claim 8, wherein the electric machine is coupled to the variable displacement hydraulic pump when the dog clutch is engaged in the first position.

11. The hybrid HVT system of claim 8, wherein the electric machine is coupled to the variable displacement hydraulic motor, via the planetary gear set, when the dog clutch is engaged in the second position.

12. The hybrid HVT system of claim 8, wherein the variable displacement hydraulic motor is selectively rotationally coupled to the output shaft via a first drive range clutch.

13. A method for a transmission system, comprising:

responsive to a battery charge request, commanding activation of an electric machine to rotate an electric machine shaft at a first speed, commanding activation of a prime power source to rotate an input shaft at the first speed, and actuating a dog clutch to a first position to rotationally couple the electric machine shaft to the input shaft and to a hydraulic pump that is rotationally coupled to the input shaft; and, responsive to a power recovery or power boost request, actuating the dog clutch to a second position to rotationally couple the electric machine to an output shaft and to a hydraulic motor by directly rotationally coupling the electric machine to a carrier of a planetary gear set, where the planetary gear set includes the carrier rotationally coupled to the output shaft, a sun gear rotationally coupled to the hydraulic motor, and a ring gear rotationally coupled to one or more clutches connected to the input shaft.

14. The method of claim 13, further comprising:

responsive to receiving none of the battery charge request, power recovery, or power boost request, commanding activation of the dog clutch to a neutral position to mechanically isolate the electric machine from the input shaft and the output shaft.

15. The method of claim 13, further comprising actuating a drive range clutch arranged on the input shaft to direct power flow from the prime power source to the planetary gear set such that a shaft fixedly coupled to the sun gear of the planetary gear set rotates in a forward direction.

16. The method of claim 13, further comprising actuating a reverse clutch arranged on the input shaft to direct power flow from the prime power source to the planetary gear set such that a shaft fixedly coupled to the sun gear of the planetary gear set rotates in a reverse direction.

17. The method of claim 13, further comprising actuating a first drive range clutch to selectively couple the hydraulic motor to the output shaft.

* * * * *